United States Patent
Shekhar et al.

(10) Patent No.: US 10,694,197 B2
(45) Date of Patent: Jun. 23, 2020

(54) COMPOSITION BASED DYNAMIC PANEL MODE SWITCH

(71) Applicant: QUALCOMM Incorporated, San Diego, CA (US)

(72) Inventors: Jayant Shekhar, Hyderabad (IN); Kalyan Thota, Hyderabad (IN); Krishna Chaitanya Devarakonda, Hyderabad (IN); Raviteja Tamatam, Hyderabad (IN); Sandeep Panda, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 15/873,742

(22) Filed: Jan. 17, 2018

(65) Prior Publication Data

US 2019/0222855 A1  Jul. 18, 2019

(51) Int. Cl.
*H04N 19/187* (2014.01)
*G06T 7/38* (2017.01)
*G06F 3/14* (2006.01)
*G09G 3/36* (2006.01)
*G09G 5/12* (2006.01)
*G06T 7/254* (2017.01)
*G09G 5/36* (2006.01)

(52) U.S. Cl.
CPC ......... *H04N 19/187* (2014.11); *G06F 3/1431* (2013.01); *G06T 7/254* (2017.01); *G06T 7/38* (2017.01); *G09G 3/3618* (2013.01); *G09G 5/12* (2013.01); *G09G 5/363* (2013.01); *G09G 2320/103* (2013.01); *G09G 2340/0435* (2013.01)

(58) Field of Classification Search
CPC ........... H04N 19/187; G09G 2320/103; G09G 2340/0435
See application file for complete search history.

(56) References Cited

U.S. PATENT DOCUMENTS

| | | | |
|---|---|---|---|
| 2013/0057763 A1* | 3/2013 | Cha ........................ | G09G 5/006 348/554 |
| 2013/0293779 A1* | 11/2013 | Li ............................ | H04N 5/06 348/521 |
| 2014/0098110 A1* | 4/2014 | Ju .............................. | G06T 9/00 345/501 |
| 2014/0098893 A1* | 4/2014 | Ju ........................ | H04N 19/127 375/240.26 |

(Continued)

FOREIGN PATENT DOCUMENTS

CN  104156189 A  11/2014

*Primary Examiner* — Michael Pervan
(74) *Attorney, Agent, or Firm* — Shumaker & Sieffert, P.A.

(57) ABSTRACT

A device includes a display client configured to output pixel data at a display and a processor. The processor is configured to determine a composition of one or more layers for display at the display client. The processor is further configured to select a video mode or a command mode as a selected mode, based on the determined composition. Pixel data for each frame to be displayed is output to the display client when operating in the video mode. Pixel data for frames that include different pixel data for at least one pixel than a previously output frame is output to the display client when operating in the command mode. The processor is further configured to output an instruction to operate in the selected mode.

28 Claims, 7 Drawing Sheets

(56) References Cited

U.S. PATENT DOCUMENTS

| | | |
|---|---|---|
| 2014/0267842 A1 | 9/2014 | Lee et al. |
| 2014/0306969 A1* | 10/2014 | Tang .................. G09G 5/006 |
| | | 345/520 |
| 2015/0138212 A1 | 5/2015 | Bae et al. |
| 2015/0145875 A1 | 5/2015 | Pangam et al. |
| 2016/0180796 A1* | 6/2016 | Morein ................. G06T 11/60 |
| | | 345/629 |
| 2016/0189333 A1* | 6/2016 | Morein ................. G09G 3/00 |
| | | 345/555 |
| 2017/0208350 A1 | 7/2017 | Herrick et al. |

\* cited by examiner

COMPOSITION BASED DYNAMIC PANEL MODE SWITCH

TECHNICAL FIELD

This disclosure relates to techniques for graphics processing.

BACKGROUND

Visual content for display, such as content for graphical user interfaces and video games, may be generated by a graphics processing unit (GPU) of a display host. A GPU may convert two-dimensional or three-dimensional (3D) objects into a two-dimensional (2D) pixel representation that may be displayed. The display host may output the two-dimensional (2D) pixel representation to a display client for output at a display (e.g., liquid-crystal display (LCD) panel).

SUMMARY

In general, the techniques of this disclosure relate to a display host configured to dynamically switch a display client between a video mode and a command mode to minimize a bandwidth used to display video content. In video mode, the display host may output pixel data for every frame to the display client. In command mode, the display host may output pixel data only for frames that are different than a previously output frame.

In an example of the disclosure, a method of graphics processing includes determining, by a processor of a computing device, a composition of one or more layers for display at a display client. The method further includes selecting, by the processor, a video mode or a command mode as a selected mode, based on the determined composition. Pixel data for each frame to be displayed is output to the display client when operating in the video mode. Pixel data for frames that include different pixel data for at least one pixel than a previously output frame is output to the display client when operating in the command mode. The method further includes outputting, by the processor, an instruction to operate in the selected mode.

Another example in accordance with the techniques of this disclosure describes a device including a display client configured to output pixel data at a display and a processor. The processor is configured to determine a composition of one or more layers for display at the display client. The processor is further configured to select a video mode or a command mode as a selected mode, based on the determined composition. Pixel data for each frame to be displayed is output to the display client when operating in the video mode. Pixel data for frames that include different pixel data for at least one pixel than a previously output frame is output to the display client when operating in the command mode. The processor is further configured to output an instruction to operate in the selected mode.

Another example in accordance with the techniques of this disclosure describes a device. The device includes means for determining a composition of one or more layers for display at a display client. The device further includes means for selecting a video mode or a command mode as a selected mode, based on the determined composition. Pixel data for each frame to be displayed is output to a display client when operating in the video mode. Pixel data for frames that include different pixel data for at least one pixel than a previously output frame is output to the display client when operating in the command mode. The device further includes means for outputting an instruction to operate in the selected mode.

Another example in accordance with the techniques of this disclosure describes a non-transitory computer-readable storage medium that includes instructions stored thereon. The instructions, when executed, may cause a processor to determine a composition of one or more layers for display at a display client. The instructions may further cause the processor to select a video mode or a command mode as a selected mode, based on the determined composition. Pixel data for each frame to be displayed is output to a display client when operating in the video mode. Pixel data for frames that include different pixel data for at least one pixel than a previously output frame is output to the display client when operating in the command mode. The instructions may further cause the processor to output an instruction to operate in the selected mode.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
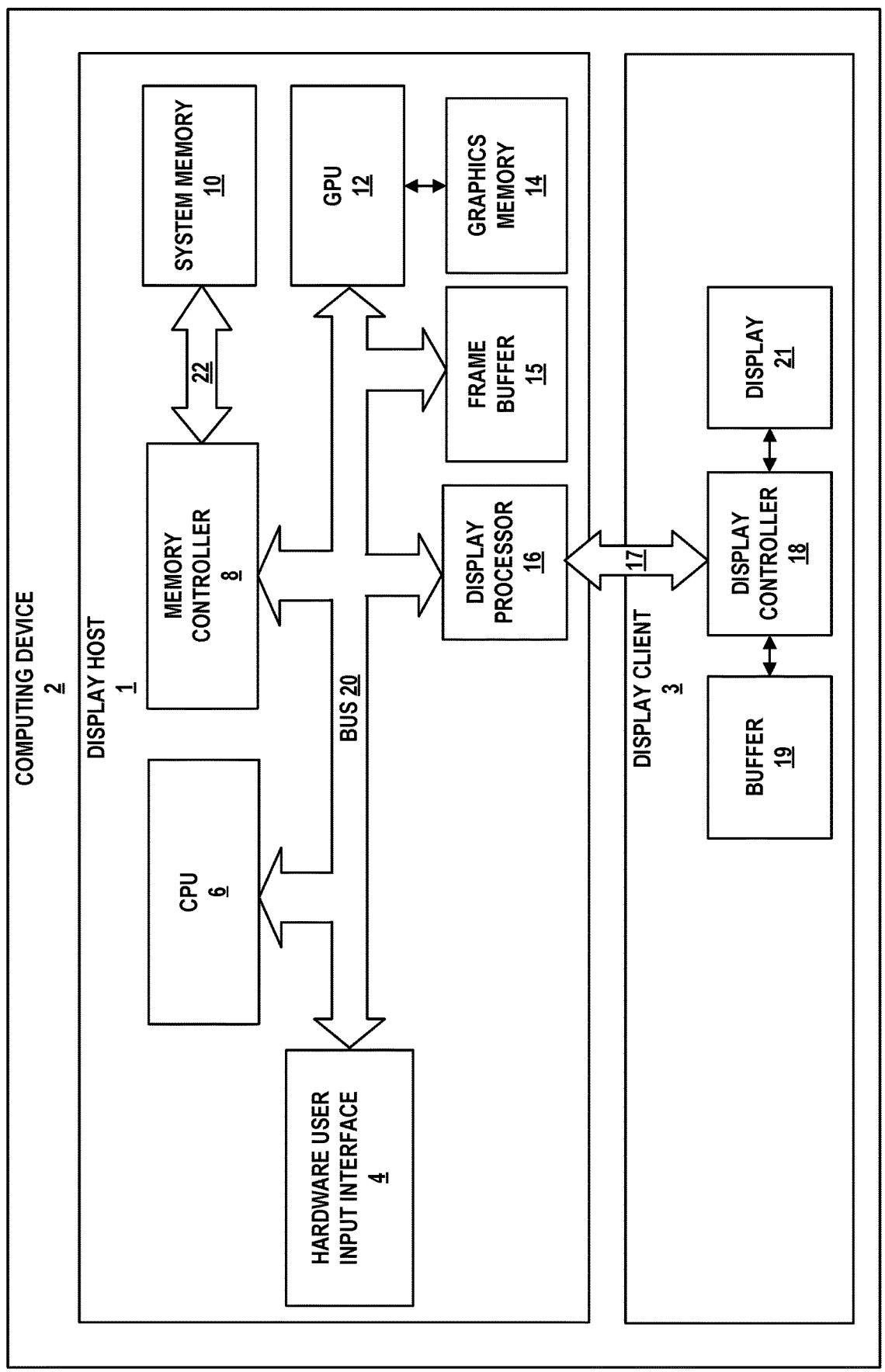
FIG. 1 is a block diagram illustrating an example computing device that may be used to determine whether to use a video mode or a command mode in accordance with the techniques of this disclosure.

In general, the techniques of this disclosure relate to a display host configured to dynamically switch a display client between a video mode and a command mode to minimize a bandwidth used to display video content. For example, the display host may operate the display client in video mode when the display client outputs video content at a maximum display refresh rate for the display client, for instance, when displaying animations.

In video mode, the display host may output pixel data for each frame to the display client, which outputs the pixel data to a display without storing the pixel data. This operation may be similar to traditional RGB interfaces. For example, a GPU pipeline of the display host may include a layer composition step that generates a composite layer for output at the display client, a post processing step that generates an enhanced frame from the composite layer, and a timing control step for controlling when to output pixel data of the enhanced frame to the display client. In this example, the display client constantly (e.g., every 16.6 milliseconds) refreshes a frame output using pixel data received from the display host.

In command mode, the display host may send pixel data to a display client for storage at a buffer (e.g., ping-pong buffer). For example, a GPU pipeline of the display host may include a layer composition step that generates a composite layer for output at the display client and a post processing step that generates an enhanced frame from the composite layer. In command mode, however, the GPU pipeline may only output pixel data for an upcoming frame to a frame buffer that is different than a previously output frame. That is, for example, the display client may continue outputting pixel values stored in a buffer of the display client without further output from the display host. In response to a change of pixel data of at least one pixel, the display host may output pixel data for all or a portion of a frame for storage at a buffer of the display client. Once the pixel data is stored at the frame buffer, the display client may read the pixel data from the buffer and update the pixel data output at a display of the display host.

Accordingly, in command mode, access to a buffer (e.g., a ping-pong buffer) is available to store frame content such that, in some examples, pixel data that changes may be output by the display host to the display client. In video mode, however, the display host, in some examples, may output pixel data for each frame to the display client, which outputs the pixel data without storing the pixel data.

In applications where the display client outputs video content with a relatively high frames rate (e.g., high frames per second (fps)), display clients operating in video mode may use less bandwidth compared to display clients operating in command mode. Examples of applications where the display client outputs video content with a relatively high frames rate may include continuous user interface (UI) scrolling (a newspaper application, a settings scroll, etc.) and working on a drawing application (3D design application, painting application, etc.). Some display use-cases where a display client operating in video mode consumes less power than operating in command mode may include instances where a composition involves a single layer use-case, instances where a composition involving multiple full frame updates with max display refresh rate, and other instances. In many applications, however, display clients operating in command mode use less bandwidth to display graphical content compared to display clients operating in video mode, particularly when the pixel data to be output at the display client is relatively constant. As such, display clients are frequently configured to operate in command mode instead of video mode.

Rather than necessarily operating in command mode, the display host may dynamically switch the display client between the video mode and the command mode based on a composition of one or more layers for display at the display client. For example, the display host may be configured with composition rules to make a mode switch when the composition corresponds to no frame updates or when the composition corresponds to multiple full frame updates. For instance, in response to the display host determining that a single layer updates an entire instant frame of a video and that an incoming single layer updates an entire next frame in the video, the display host may determine that the composition involves multiple full frame updates and dynamically switch the display client to the video mode. However, in response to the display host determining that there are no frame updates in a subsequent frame, the display host may dynamically switch the display client to the command mode. In this way, the display host may dynamically operate the display client in a mode (e.g., command or video) that reduces a bandwidth used compared to systems that operate the display client only in a single mode (e.g., command mode or only in video mode).

FIG. 1 is a block diagram illustrating an example computing device 2 that may be used to determine whether to use a video mode or a command mode in accordance with the techniques of this disclosure. Computing device 2 may include, for example, a personal computer, a desktop computer, a laptop computer, a tablet computer, a computer workstation, a video game platform or console, a mobile telephone such as, e.g., a cellular or satellite telephone, a landline telephone, a smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a display host 1, a display client 3, and a bus 17. Display host 1 may include a hardware user input interface 4, a central processing unit (CPU) 6, a memory controller 8, a system memory 10, a graphics processing unit (GPU) 12, a graphics memory 14, a frame buffer 15, a display processor 16, and buses 20 and 22. Display client 3 may include display controller 18, buffer 19, and display 21.

Note that in some examples, graphics memory 14 may be "on-chip" with GPU 12. In some cases, hardware elements of display host 1 may be on-chip, for example, in a system on a chip (SoC) design. Hardware user input interface 4, CPU 6, memory controller 8, GPU 12 and display processor 16 may communicate with each other using bus 20. Memory controller 8 and system memory 10 may also communicate with each other using bus 22.

Buses 17, 20, and 22 may be any of a variety of bus structures, such as a third generation bus (e.g., a Hyper-Transport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure. Moreover, there may not be three separate buses 17, 20, and 22, and there may be one bus the interconnects the components of computing device 2.

CPU 6 may include a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch screen, a touch pad, or another input device that is coupled to computing device 2 via hardware user input interface 4.

The software applications that execute on CPU 6 may include one or more graphics rendering instructions that instruct CPU 6 to cause the rendering of graphics data by GPU 12 for display on display 21. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. The instructions may also conform to so-called heterogeneous computing libraries, such as OpenCL, and/or DirectCompute in various examples.

In order to process the graphics rendering instructions, CPU 6 may issue one or more graphics rendering commands to GPU 12 (e.g., through GPU driver 7 described with respect to FIG. 2) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 21. In addition, system memory 10 may store user applications and application surface data associated with the applications.

System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers (e.g., frame buffer 15), or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 21. Thus, when one of the software applications executing on CPU 6 requires graphics processing, CPU 6 may provide graphics commands and graphics data to GPU 12 for rendering to display 21. The graphics data may include, e.g., drawing commands, state information, primitive information, texture information, etc.

GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics frames (e.g., GUIs and two-dimensional (2D) and/or three-dimensional (3D) graphics scenes) onto display 21 more quickly than drawing the scenes directly to display 21 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered pixel data in a frame buffer 15. As shown, frame buffer 15 may be an independent memory. In some examples, frame buffer 15 may be allocated within system memory 10. In some examples, frame buffer 15 may be allocated within graphics memory 14. Frame buffer 15 may be attached to system memory 10 and/or to graphics memory 14.

Display processor 16 may retrieve pixel data from frame buffer 15 and output pixel data to display client 3 via bus 17. In some examples, display processor 16 may process the pixel data. Display processor 16 may include one or more processors, such as one or more microprocessors, application specific integrated circuits (ASICs), field programmable gate arrays (FPGAs), digital signal processors (DSPs), or other equivalent integrated or discrete logic circuitry. Bus 17 may be serial interface. In some examples, bus 17 may be a display serial interface (DSI). Bus 17 may be compliant with the MIPI Display Serial Interface (MIPI DSI$^{SM}$).

Display controller 18 may receive the data from bus 17. In some examples, display controller 18 may store the data from bus 17 into buffer 19. For example, display controller 18 may output the data stored in buffer 19 to display 21 (e.g., in command mode). In some examples, display controller 18 may output the data from bus 17 directly to display 21 (e.g., in video mode). In any case, display controller 18 may be configured to cause display 21 to display the frame represented by the rendered pixel data. Display controller 18 may include a digital-to-analog converter (DAC) that is configured to convert the digital values retrieved from buffer 19 or via bus 17 into an analog signal consumable by display 21. In other examples, display controller 18 may pass digital values directly to display 21 for processing. Display controller 18 may include one or more processors, such as one or more microprocessors, application specific integrated circuits (ASICs), field programmable gate arrays (FPGAs), digital signal processors (DSPs), or other equivalent integrated or discrete logic circuitry.

While frame buffer 15 may store pixel data local to CPU 6 and GPU 12 (e.g., a display host), buffer 19 may represent a local memory to display 21 (e.g., a display client). For example, during command mode, display 21 may retrieve pixel data for output from buffer 19 rather than relying on an output from display processor 16.

Buffer 19 may be configured for multiple buffering, for example, where one or more portions of buffer 19 may store one block of data such that a reader (e.g., display controller 18, display 21, etc.) may retrieve a frame from buffer 19 while a writer (e.g., CPU 6, GPU 12, display processor 16, etc.) writes to one or more other portions of buffer 19. Some examples of a multiple buffer may include a "ping-pong buffer" or double buffer, which may include a first portion and a second portion. In this example, during a first state, the first portion is being filled with pixel data for an upcoming frame while the second buffer is output on display 21. In this example, during a second state, the second portion is being filled with pixel data for an upcoming frame while the first portion is output on display 21. Buffer 19 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, display 21 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 21 may be integrated within computing device 2. For instance, display 21 may be a screen of a mobile telephone. Alternatively, display 21 may be a stand-alone device coupled to computing device 2 via a wired or wireless communications link. For instance, display 21 may be a computer monitor or flat panel display connected to a personal computer via a cable or wireless link.

According to examples of the disclosure, computing device 2 may dynamically operate display client 3 in a video mode or a command mode. In video mode, display host 2 may output pixel data for each frame to display client 3 via bus 17. In this example, display client 3 may output the pixel data without storing the pixel data at display client 3 (e.g., at buffer 19). This operation may be similar to traditional RGB interfaces. For example, in video mode, a display processor pipeline of display processor 16 may include a layer composition step that generates a composite layer for output at display client 3, a post processing step that generates an enhanced frame from the composite layer, and a timing control step for controlling when to output pixel data of the enhanced frame to a line buffer of display client 3. In this example, display client 3 constantly refreshes a frame output using pixel data output by display host 1.

In command mode, display host 1 may only output pixel data for an upcoming frame that is different than a previously output frame. That is, for example, display client 3 may be configured to output pixel values stored in buffer 19 without further output from display host 1. In response to a change of pixel data of at least one pixel, display host 1 may output pixel data for all or a portion of a frame for storage at buffer 19. Once the pixel data is stored at buffer 19, display client 3 may read the pixel data from buffer 19 and output pixel data from buffer 19 at display 21.

More specifically, for example, CPU 6 may determine a composition of one or more layers for display at display client 3. CPU 6 may select a video mode or a command mode as a selected mode, for operating display processor 16, based on the determined composition. For example, in response to determining that the composition corresponds to no changes from a previous composition of the one or more layers for display at display client 3, CPU 6 may select the command mode as the selected mode. In some examples, in response to determining that the composition corresponds to a single layer, CPU 6 may select the video mode as the selected mode. In any case, CPU 6 may output an instruction to display processor 16 to operate in the selected mode.

Figure 2:
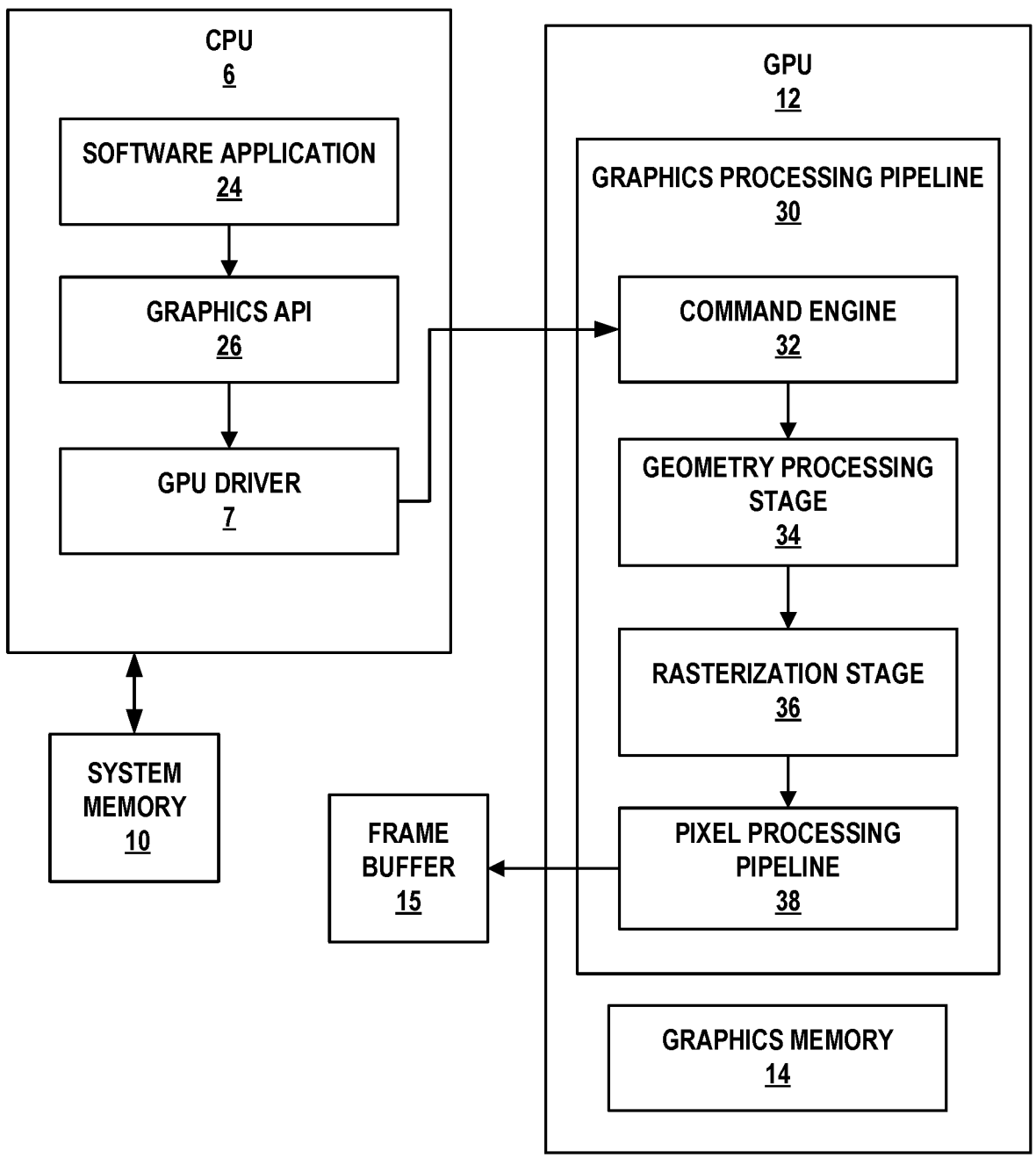
FIG. 2 is a block diagram illustrating example implementations of a central processing unit, a graphics processing unit, system memory, and a frame buffer of FIG. 1 in further detail.

FIG. 2 is a block diagram illustrating example implementations of central processing unit 6, graphics processing unit 12, system memory 10, and frame buffer 15 of FIG. 1 in further detail. CPU 6 may include at least one software application 24, a graphics API 26, and a GPU driver 7, each of which may be one or more software applications or services that execute on CPU 6. GPU 12 may include graphics memory 14 and a graphics processing pipeline 30 that includes a plurality of graphics processing stages that operate together to execute graphics processing commands. GPU 12 may be configured to execute graphics processing pipeline 30 in a variety of rendering modes, including, for example, a binning rendering mode and a direct rendering mode.

As shown in FIG. 2, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered pixel data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics frames. In various examples, the commands may include so-called "packets" of data which may include commands, as well as other information related to rendering a scene (i.e. one or more frames). For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc.

The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs.

A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

GPU driver 7 may send commands, e.g. command packets including one or more commands, headers, render scene descriptors, buffers, etc. to GPU 12 that define the rendering mode that GPU 12 should use when rendering a frame or a portion of a frame. For example, GPU driver 7 may determine that a particular frame should be rendered using direct mode rendering, and another frame should be rendered using binning mode rendering. GPU driver 7 may instruct GPU 12 to determine which rendering mode to when rendering a portion of a frame by sending a GPU command packet to GPU 12.

Graphics processing pipeline 30 may be configured to receive one or more graphics processing commands from CPU 6, via GPU driver 7, and to execute the graphics processing commands to generate displayable graphics frames. As discussed above, graphics processing pipeline 30 includes a plurality of stages that operate together to execute graphics processing commands. However, such stages need not necessarily be implemented in separate hardware blocks. For example, portions of geometry processing stage 34 and pixel processing pipeline 38 may be implemented as part of a unified shader unit.

Command engine 32 may receive graphics processing commands and configure the remaining processing stages within graphics processing pipeline 30 to perform various operations for carrying out the graphics processing commands. Command engine 32 may receive the command packet from GPU driver 7. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates.

Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive.

Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

Figure 3:
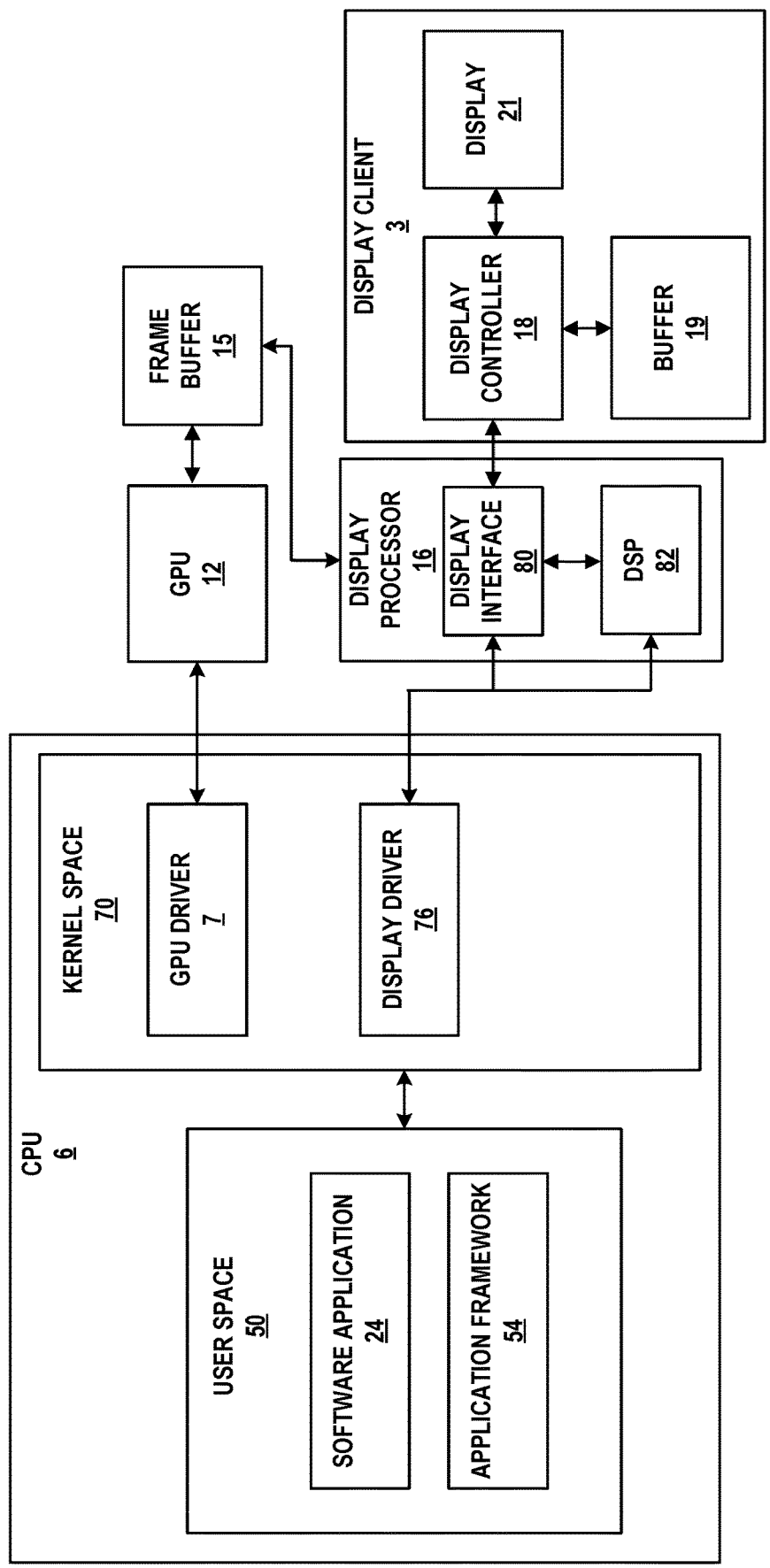
FIG. 3 is a block diagram illustrating example implementations of a central processing unit, a display processor, and a display client of FIG. 1 in further detail.

FIG. 3 is a block diagram illustrating example implementations of central processing unit 6, display processor 16, and display client 3 of FIG. 1 in further detail. FIG. 3 includes CPU 6, GPU 12, frame buffer 15, display processor 16, and display client 3. As shown, user space 50 and kernel space 70 may be executed by CPU 6. User space 50 may include software application 24 and application framework 54. Kernel space 70 may include GPU driver 7 and display driver 76.

Software application 24 may include one or more applications that execute on CPU 6, for example, but not limited to, an operating system, a word processor application, an email application, a spread sheet application, a media player application, a video game application, a graphical user interface application or another program. Application framework 54 may include software framework that may be used to with software application 24. Examples of application framework 54 may include, but are not limited to, MacApp, Microsoft Foundation Class Library, Oracle Application Development Framework, MARTHA framework, and other application frameworks. In some examples, an application framework 54 may include one or more application program interfaces (APIs).

GPU driver 7 may be configured to cause GPU 12 to operate to perform various functions according to outputs from user space 50. For example, GPU driver 7 may be configured to initiate GPU 12 to perform graphics processing in accordance with graphics processing pipeline 30 of FIG. 2. Display driver 76 may be configured to control display processor 16. For example, display driver 76 may cause CPU 6 to determine a composition of one or more layers for display at display client 3. In some examples, display driver 76 may cause CPU 6 to select a video mode or a command mode as a selected mode, for operating display processor 16, based on the determined composition and output an instruction to display processor 16 to operate in the selected mode.

Display processor 16 may be configured to operate functions of display client 3 according to outputs from CPU 6. Display processor 16 may include a display interface 80 and digital signal processor (DSP) 82. Display interface 80 may be configured to cause display client 3 to operate in a selected mode. DSP 82 may process pixel data retrieved from frame buffer 15 for output to display client 3. For example, DSP 82 may perform post processing of the pixel data. In some examples, one or more functions of display processor 16, as described herein, may be performed by GPU 12.

In operation, user space 50 outputs commands to kernel space 70 for outputting pixel data at display client 3. GPU driver 7 may cause CPU 6 to generate one or more instructions for causing GPU 12 to generate the pixel data at frame buffer 15. For instance, GPU 12 executes graphics processing pipeline 30 of FIG. 2. Display driver 76 causes CPU 6 to determine a composition of one or more layers for display at display client 3.

Display driver 76 may cause CPU 6 to select the video mode as the selected mode based on the determined composition. In some examples, display driver 76 may cause CPU 6 to operate display client 3 in video mode in response to determining that the composition involves a single layer. A composition involving a single layer may refer to instances where only one layer is used to generate pixel data for an entire frame. Examples of applications that may use a single layer may include, but are not limited to, a full-screen reader, an animation (e.g., Android™ animation), settings application scroll, or another application that uses a single layer. In some examples, display driver 76 may cause CPU 6 to operate display client 3 in video mode in response to determining that the composition corresponds to multiple full frame updates. In some examples, display driver 76 may cause CPU 6 to operate display client 3 in video mode in response to determining that the composition corresponds to a maximum display refresh rate. Further, in some examples, display driver 76 may cause CPU 6 to operate display client 3 in video mode in response to determining that the composition involves a single layer, the composition involves multiple full frame updates, and the composition involves a maximum display refresh rate.

In some examples, display driver 76 may cause CPU 6 to determine that the composition involves multiple full frame updates when an incoming layer indicates an update. For example, in response to determining that a single layer updates an instant frame of a video but that an incoming single layer does not update a next frame in the video, display driver 76 may cause CPU 6 to determine that the composition does not involve multiple full frame updates. However, in response to determining that a single layer updates an instant frame of a video and that an incoming single layer updates a next frame in the video, display driver 76 may cause CPU 6 to determine that the composition involves multiple full frame updates.

More specifically, for example, display driver 76 may cause CPU 6 to determine a first composition of one or more layers for a first frame (e.g., a current frame) for display at display client 3, a second composition of one or more layers for a second frame (e.g., a previous frame) for display at display client 3, and a third composition of one or more layers for a third frame (e.g., a subsequent frame) for display at display client 3. In this example, display driver 76 may cause CPU 6 to determine that the first composition corresponds to multiple full-frame updates when the first composition indicates different pixel data for at least one pixel than pixel data indicated by the second composition and pixel data indicated by the third composition.

In some examples, display driver 76 may cause CPU 6 to operate display client 3 in command mode in response to determining that an incoming composition of one or more layers for display at display client 3 involves no changes from a current composition of one or more layers for display at display client 3. For example, display driver 76 may cause CPU 6 to determine that the composition indicates a static screen use-case when the incoming composition of one or more layers for display at display client 3 involves no changes from a current composition of one or more layers for display at display client 3.

In some examples, display driver 76 may cause CPU 6 to select the video mode when the composition corresponds (e.g., matches, equals, approximately equals, etc.) to a maximum display refresh rate for display client 3. For example, display client 3 may be configured to output an indication of the maximum display refresh rate to display driver 76. In some examples, display driver 76 may be configured (e.g., programmed) with a predetermined maximum display refresh rate.

Display driver 76 may cause CPU 6 to determine whether to operate display client 3 in the video mode or the command mode using expected bandwidth values for the composition of one or more layers for display at display client 3. For example, display driver 76 may cause CPU 6 to calculate an expected video mode bandwidth usage for outputting a next frame to display client 3 when operating display client 3 in the video mode. In this example, display driver 76 may cause CPU 6 to calculate an expected command mode bandwidth usage for outputting the next frame to display client 3 when operating display client 3 in the command mode. In this example, display driver 76 may cause CPU 6 to compare the expected video mode bandwidth usage and the expected command mode bandwidth usage. In this example, display driver 76 may cause CPU 6 to select the video mode or the command mode based on the comparison. For example, display driver 76 may cause CPU 6 to select the video mode when the expected video mode bandwidth usage is less than the expected command mode bandwidth usage. In some examples, display driver 76 may cause CPU 6 to select the command mode when the expected command mode bandwidth usage is less than the expected video mode bandwidth usage.

More specifically, for example, display driver 76 may cause CPU 6 to calculate an expected video mode bandwidth usage for outputting a next frame to display client 3 when operating display client 3 in the video mode based on one or more composition characteristics. Examples of composition characteristics may include, but are not limited to, a source width, a source height, a format, a frame-per-second value, panel poses, a destination width, a destination height, a composition factor, or another composition characteristic. As used herein, a composition factor may refer to an amount of compression applied by DSP 82. Similarly, in some examples, display driver 76 may cause CPU 6 to calculate an expected command mode bandwidth usage for outputting a next frame to display client 3 when operating display client 3 in the command mode based on one or more composition characteristics.

Display driver 76 may cause CPU 6 to output an instruction to display processor 16 to operate in the selected mode. In response to the instruction, DSP 82 performs post-processing of pixel data for the selected mode and display interface 80 outputs the pixel data according to the selected mode. For example, display interface 80 outputs, to display client 3, pixel data for frames that include different pixel data for at least one pixel than a previously output frame when the selected mode corresponds to a command mode. In some examples, display interface 80 may refrain from outputting, to display client 3, pixel data for frames that do not include different pixel data for at least one pixel than a previously output frame when the selected mode corresponds to a command mode. In some examples, display interface 80 outputs, to display client 3, pixel data for each frame to be displayed when the selected mode corresponds to a video mode.

Although FIG. 3 describes display processor 16 as separate from GPU 12, in some examples one or more processes performed by display processor 16 may be instead performed by GPU 12. That is, for example, any action described as performed by display processor 16 may be performed by GPU 12. Moreover, in some examples, display processor 16 may be omitted. For instance, GPU 12 may perform one or more functions of DSP 82 and/or display interface 80. In some instances, GPU driver 7 may perform one or more functions of display driver 76.

Figure 4:
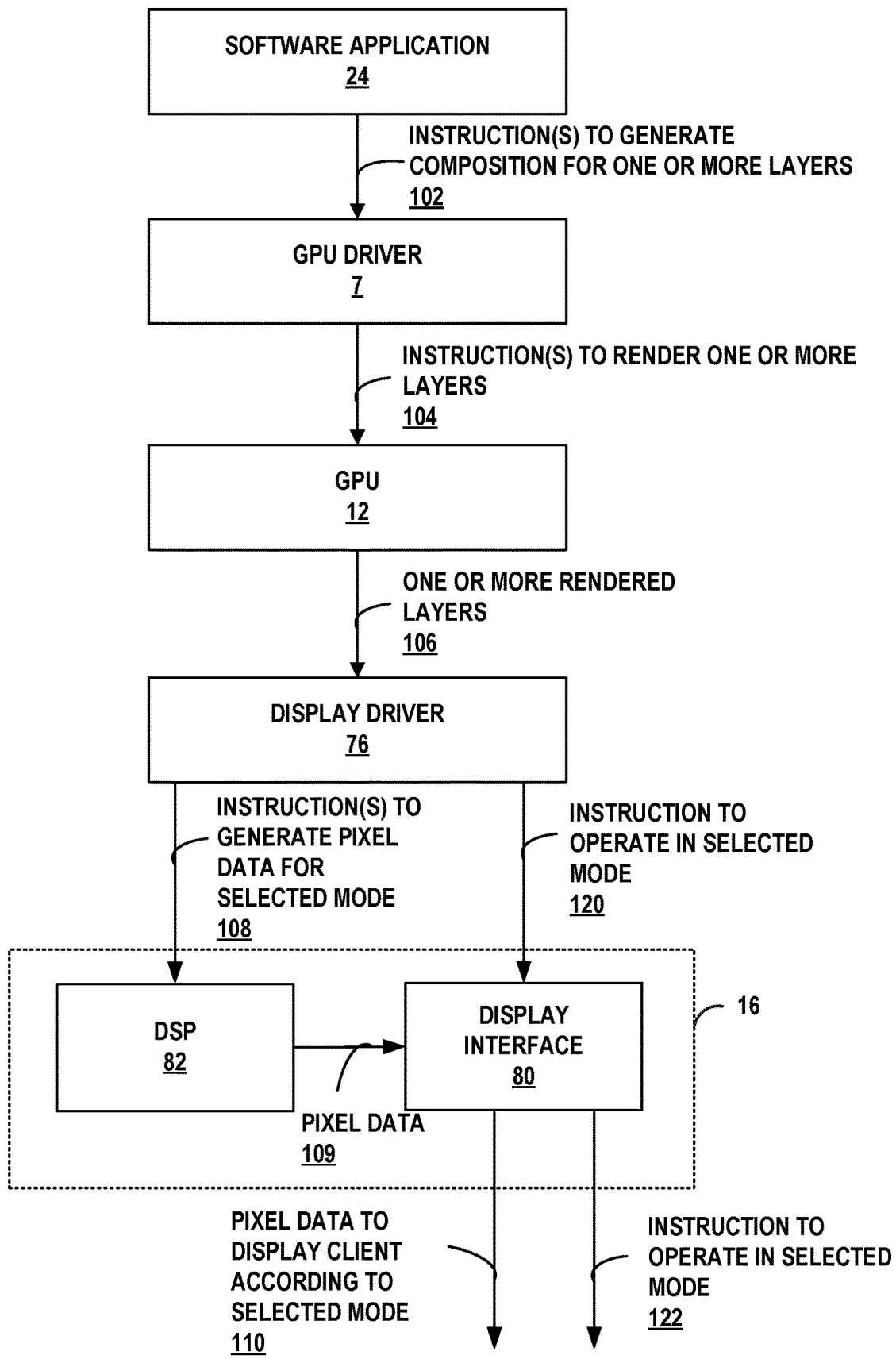
FIG. 4 is a flowchart illustrating techniques for determining whether to use a video mode or a command mode.

FIG. 4 is a flowchart illustrating techniques for determining whether to use a video mode or a command mode. In the example of FIG. 4, software application 24 outputs instructions to generate a composition for one or more layers 102. For example, software application 24 may execute an application that generates instructions for a single layer. Examples of applications that generate instructions for a single layer may include, but are not limited to, a full-screen reader, an animation (e.g., a set of frames output at a high frame-per-second value (e.g., 60 frames-per-second)), a settings application scroll, or another application that generates instructions for a single layer.

GPU driver 7 may output one or more instructions to render the one or more layers 104. For example, GPU driver 7 may output one or more instructions to render the one or more layers to GPU 12. In some examples, GPU driver 7 may further output one or more instructions to generate at least a portion of the composition for the one or more layers. In some examples, GPU 12 may output one or more rendered layers 106. For example, GPU 12 may render the one or more layers based on the instructions from GPU driver 7 and output the one or more rendered layers to display driver 76.

Display driver 76 may receive the one or more rendered layers from GPU 12. In some examples, GPU 12 may further output at least a portion of the composition for the one or more layers 106.

Display driver 76 may cause a processor to output one or more instructions to generate pixel data for a selected mode 108. For example, in response to selecting the command mode as the selected mode, display driver 76 may cause a processor to output, to DSP 82, one or more instructions to generate pixel data representative of each upcoming frame that include different pixel data for at least one pixel than a previously output frame. In some examples, in response to selecting the video mode as the selected mode, display driver 76 may cause a processor to output, to DSP 82, one or more instructions to generate a stream of pixel data representative of each upcoming frame.

DSP 82 outputs pixel data 109 according to the selected mode. For example, DSP 82 outputs pixel data for each frame when the selected mode is video mode. In some examples, DSP 82 outputs pixel data for pixel data representative of each upcoming frame that includes different pixel data for at least one pixel than a previously output frame when the selected mode is command mode. In any case, DSP 82 outputs pixel data 109 to display interface 80. Display interface 80 outputs pixel data 110 to display client 3. For instance, display interface 80 outputs pixel data 110 to display client 3 according to an interface protocol, such as, but not limited to, MIPI Display Serial Interface (MIPI DSI$^{SM}$).

In the example of FIG. 4, display driver 76 outputs an instruction to operate in a selected mode 120. For example, display driver 76 outputs an instruction to operate in a video mode or a command mode to display interface 80 of display processor 16. Display interface 80 outputs an instruction to operate in a selected mode 122. For example, display interface 80 outputs an instruction to operate in video mode to display client 3 of FIG. 1 when the selected mode is video mode. In some examples, display interface 80 outputs an instruction to operate in command mode to display client 3 of FIG. 1 when the selected mode is command mode.

Figure 5A:
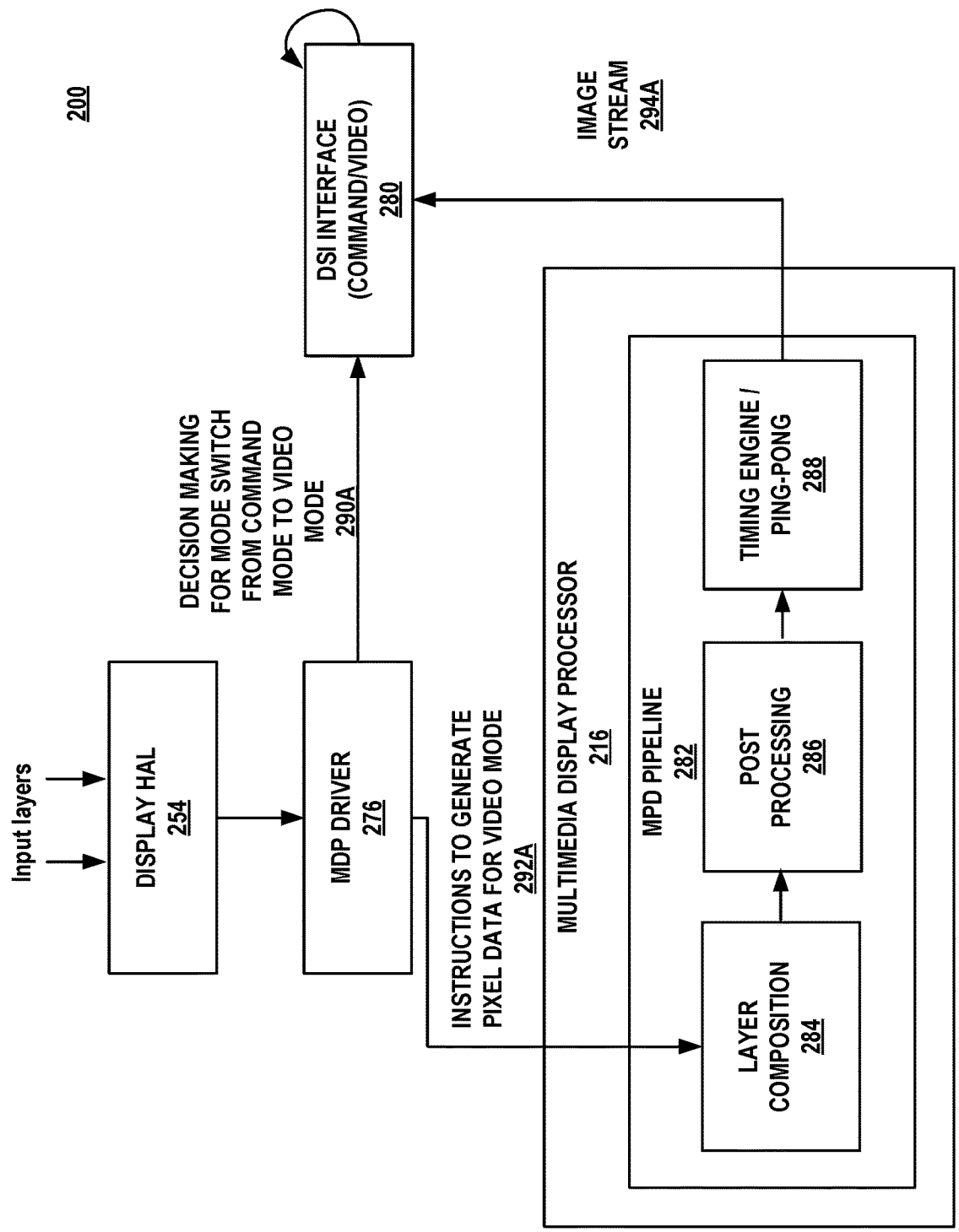
FIG. 5A is a diagram illustrating an example multimedia display processor driver and multimedia display processor pipeline that selects a video mode.

FIG. 5A is a diagram illustrating an example multimedia display processor (MDP) driver 276 and MDP pipeline 282 that selects a video mode. System 200 includes display hardware abstraction layer (HAL) 254, MDP driver 276, display serial interface (DSI) interface 280, and MDP 216. MDP driver 276 may be an example of display driver 76 of FIG. Display HAL 254 may be an example of application framework 54. DSI interface 280 may be an example of display interface 80 of FIG. 3. MDP 216 may be an example of display processor 16. Although DSI interface 280 is illustrated in FIG. 5A as separate from MDP 216, in some examples, MDP 216 may include DSI interface 280.

MDP 216 may include MDP pipeline 282 that includes a plurality of graphics processing stages that operate together to execute graphics processing commands. As shown in FIG. 5A, MDP pipeline 282 may include a layer composition 284, post processing 286, and a timing engine and ping-pong buffer 288. Each of the components in MDP pipeline 282 may be implemented as fixed-function components, programmable components, or as a combination of fixed-function and programmable components.

Layer composition 284 may compose a layer for pixel data. Post processing 286 may enhance a frame. For example, post processing 286 may modify a gamma level (e.g., brightness) or color saturation of a frame for presentation at a display. Timing engine and ping-pong buffer 288 may determine a timing to output pixel data to DSI interface 280 when operating in video mode. Timing engine and ping-pong buffer 288 may output pixel data to a ping-pong buffer via DSI interface 280 when operating in command mode. DSI interface 280 may output pixel data to a display client. For example, DSI interface 280 may output pixel data to display client 3 of FIG. 1.

As previously noted, in some systems, command mode displays are preferred over video mode displays due to potential power saving capabilities during static screen use-cases. However, there are certain display use-cases where video mode consumes lesser power than command mode. Many display use-cases where video mode consumes less power than command mode are continuous high frames-per-second (fps) use-cases.

For example, during animation, for a 1080p, 60 fps, RGBX 8888 UBWC layer, command mode, MDP 216 has a clock of 149 Mhz and a bandwidth of 469 Mbps. In this example, during animation, for a 1080p RGBX 8888 UBWC layer, video mode, MDP 216 has a clock of 138 Mhz and a bandwidth of 398 Mbps. As such, using video mode may amount to a 17% reduction in bandwidth. Therefore, for a panel supporting both video and command mode, examples described herein may dynamically switch to video mode to save power for some high fps use-cases. Examples of high fps use-cases may include, but are not limited to, continuous UI scrolling (a newspaper application, a settings application scrolling), working on a drawing application (a 3D design application, a paint application), and other high fps use-cases. Based on the composition of one or more layers for display, MDP driver 276 may decide to make a panel mode switch. In another example, a settings application scroll use-case consumed 720 milliamps when operating in command mode compared to 640 milliamps when operating in video mode, resulting in an 80 milliamp savings compared to command mode. In another example, a graphics animation use-case consumed 594 milliamps when operating in command mode compared to 571 milliamps when operating in video mode, resulting in a 23 milliamp savings compared to command mode. In another example, a boot up animation use-case consumed 990 milliamps when operating in command mode compared to 885 milliamps when operating in video mode, resulting in a 95 milliamp savings compared to command mode.

According to one or more examples described herein, MDP driver 276 may process the composition of one or more layers for display. For example, MDP driver 276 may process one or more instructions output by display HAL 254. In some examples, MDP driver 276 may process pixel data generated by executing the one or more instructions output by display HAL 254. For instance, MDP driver 276 may process pixel data generated by a graphics processing unit executing the one or more instructions output by display HAL 254.

MDP driver 276 may cause a processor to determine a mode switch based on the composition. For example, in response to determining that the composition corresponds to a single layer, MDP driver 276 may cause a processor to perform a mode switch to video mode to save power compared to command mode. However, when the composition corresponds to no changes from a previous composition of the one or more layers for display, MDP driver 276 may cause a processor to perform a mode switch to command mode to move to a static screen and disable MDP clocks. In some examples, performing a mode switch has relatively low latency compare to the saved bandwidth.

In the example of FIG. 5A, MDP driver 276 causes the processor (e.g., CPU 6) to select a video mode as a selected mode. In response to selecting the video mode as the selected mode, MDP driver 276 may cause the processor (e.g., CPU 6) to output to DSI interface 280 an indication of a mode switch from command mode to video mode 290A. Additionally, and in response to selecting the video mode as the selected mode, MDP driver 276 may cause the processor (e.g., CPU 6) to output one or more instructions to generate pixel data for the video mode 292A to MDP 216.

Layer composition 284 composes a layer for a frame according to the one or more instructions from MDP driver 276. Post processing 286 enhances pixel data for the layer output by layer composition 284. Timing engine and ping-pong buffer 288 outputs an image stream 294A of each frame to be output. For example, timing engine and ping-pong buffer 288 determines a timing to output pixel data to DSI interface 280 and outputs the pixel data to DSI interface 280. For example, timing engine and ping-pong buffer 288 outputs pixel data for each frame to DSI interface 280.

Figure 5B:
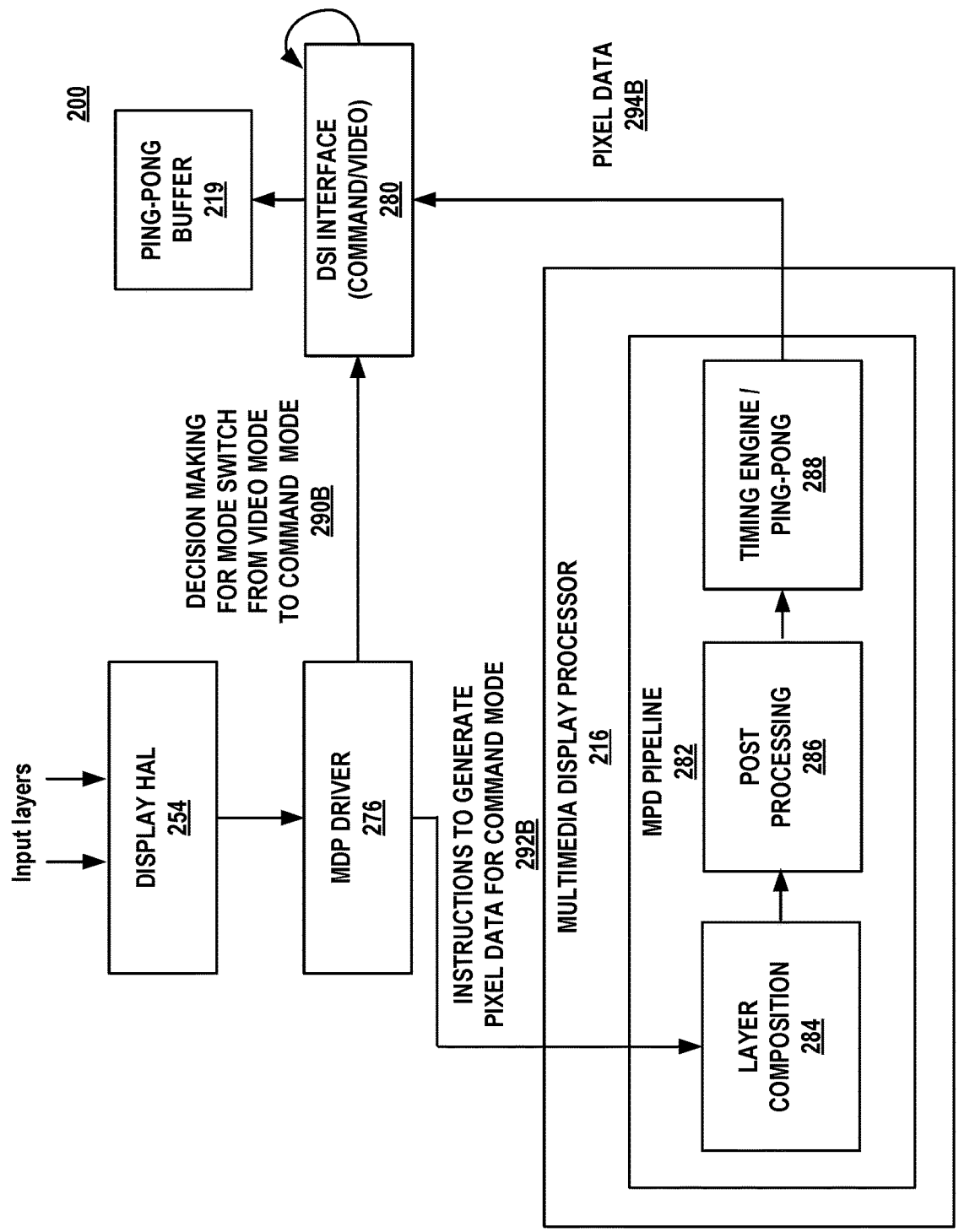
FIG. 5B is a diagram illustrating an example multimedia display processor driver and multimedia display processor pipeline that selects a command mode.

FIG. 5B is a diagram illustrating an example multimedia display MDP driver 276 and MDP pipeline 282 that selects a command mode. In the example of FIG. 5B, display HAL 254 outputs instructions to generate a frame. MDP driver 276 may cause a processor (e.g., CPU 6) to determine a composition of one or more layers for display.

In the example of FIG. 5B, MDP driver 276 may cause the processor (e.g., CPU 6) to select a command mode as a selected mode. In response to selecting the command mode as the selected mode, MDP driver 276 may cause the processor (e.g., CPU 6) to output to DSI interface 280 an indication of a mode switch from video mode to command mode (290B). Additionally, and in response to selecting the command mode as the selected mode, MDP driver 276 may cause the processor (e.g., CPU 6) to output one or more instructions to generate pixel data for the video mode (292B) to MDP 216.

Layer composition 284 composes a layer for a frame according to the one or more instructions from MDP driver 276. Post processing 286 enhances pixel data for the layer output by layer composition 284. Timing engine and ping-pong buffer 288 may output pixel data (294B). For example, timing engine and ping-pong buffer 288 may output pixel data to ping-pong buffer 219 via DSI interface 280.

Figure 6:
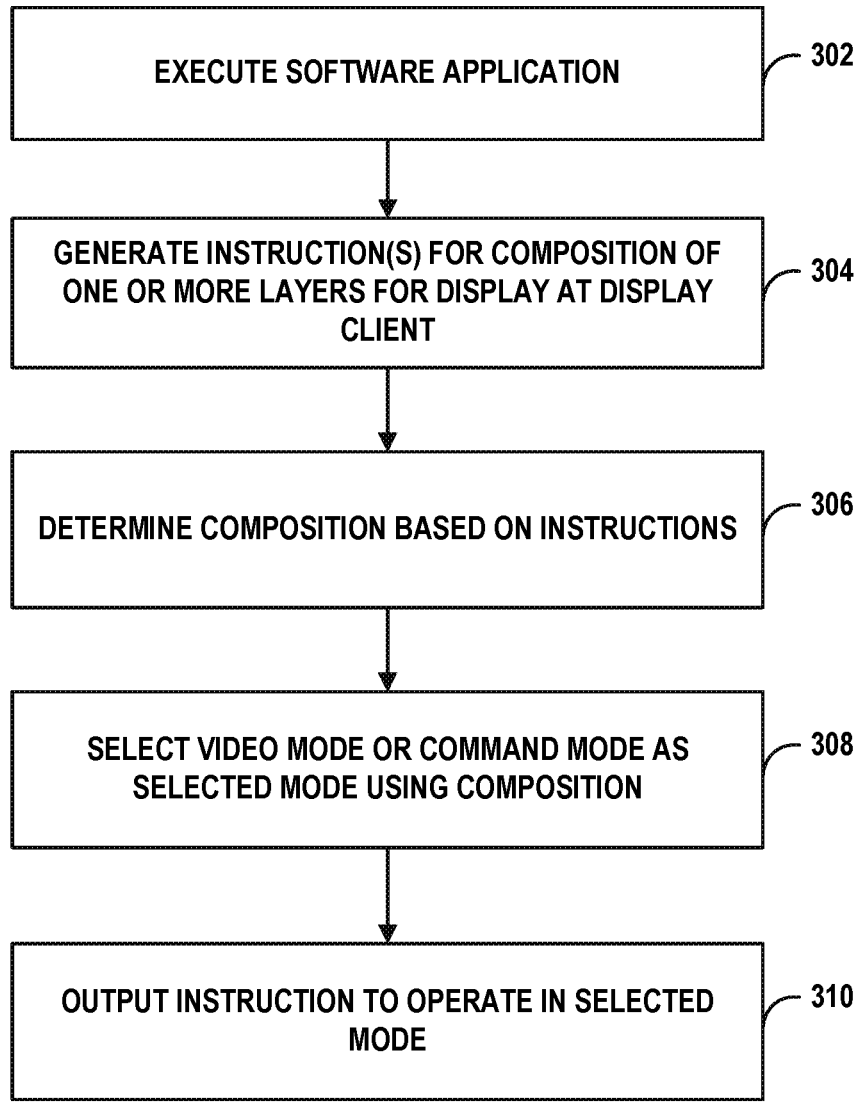
FIG. 6 is a flowchart illustrating a method according to an example of the disclosure.

FIG. 6 is a flowchart illustrating a method according to an example of the disclosure. The method of FIG. 6 may be performed by CPU 6, and/or any other hardware, firmware, software element, or combination thereof, residing on computing device 2. CPU 6 may execute a software application (302). For example, CPU 6 may execute a software application 24 of FIG. 3. CPU 6 may generate instructions to generate a composition for one or more layers (304). For example, executing software application 24 of FIG. 3 may cause CPU 6 to generate instructions to generate a composition for one or more layers.

CPU 6 may determine a composition of one or more layers for display based on the instructions (306). For example, GPU driver 7 may cause GPU 12 to output one or more rendered layers for storage at frame buffer 15. In this example, CPU 6 may determine the composition based on pixel data stored at frame buffer 15.

CPU 6 may select a video mode or command mode as a selected mode for operating a display processor (308). For example, display driver 76 may cause CPU 6 to select a video mode as a selected mode for operating display processor 16 of FIG. 3 when the composition of one or more layers for display corresponds to a single layer at a maximum frame rate. In some examples, display driver 76 may cause CPU 6 to select a command mode as a selected mode for operating display processor 16 of FIG. 3 when the composition of one or more layers for display corresponds to a static screen use-case.

CPU 6 may output an instruction to operate in the selected mode (310). For example, display driver 76 of FIG. 3 may cause CPU 6 to output an instruction to display processor 16 to operate in the selected mode. In some examples, GPU driver 7 of FIG. 3 may cause CPU 6 to output an instruction to GPU 12 to operate in the selected mode.

In one or more examples, the functions described above may be implemented in hardware, software, firmware, or any combination thereof. If implemented in software, the functions may be stored as one or more instructions or code on an article of manufacture including a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media may include RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method for graphics processing comprising:
determining, by a processor of a computing device, a composition of one or more layers for display at a display client;
selecting, by the processor, a video mode or a command mode as a selected mode based on the determined composition, wherein pixel data for each frame to be displayed is output to the display client when operating in the video mode and wherein pixel data for frames that include different pixel data for at least one pixel than a previously output frame is output to the display client when operating in the command mode, and wherein the selecting comprises:
   determining, using the composition, an expected video mode bandwidth usage for outputting a next frame to the display client when operating the display client in the video mode;
   determining, using the composition, an expected command mode bandwidth usage for outputting the next frame to the display client when operating the display client in the command mode;
   comparing the expected video mode bandwidth usage and the expected command mode bandwidth usage; and
   selecting the video mode or the command mode based on the comparison; and
outputting, by the processor, an instruction to operate in the selected mode.

2. The method of claim 1, wherein determining the expected command mode bandwidth usage for outputting the next frame to the display client when operating the display client in the command mode comprises:
determining the composition corresponds to no changes from a previous composition of the one or more layers for display at the display client,
wherein the selecting the video mode or the command mode comprises selecting the command mode.

3. The method of claim 1, wherein determining the expected video mode bandwidth usage for outputting a next frame to the display client when operating the display client in the video mode comprises:
determining the composition corresponds to a single layer,
wherein the selecting the video mode or the command mode comprises selecting the video mode.

4. The method of claim 3, further comprising:
executing one or more of a full-screen reader, an animation, or a settings application scroll to generate one or more instructions for the single layer, wherein determining the composition comprises determining that the composition corresponds to the single layer based on the execution of one or more of the full-screen reader, the animation, or the settings application scroll.

5. The method of claim 4, further comprising:
outputting, by the processor, the one or more instructions to a graphics processing unit of the computing device; and
receiving, by the processor, the composition from the graphics processing unit.

6. The method of claim 1, wherein determining the expected video mode bandwidth usage for outputting a next frame to the display client when operating the display client in the video mode comprises:
determining the composition corresponds to multiple full-frame updates,
wherein the selecting the video mode or the command mode comprises selecting the video mode.

7. The method of claim 6, wherein the composition is a first composition for a first frame and wherein determining the first composition corresponds to multiple full-frame updates comprises:
determining a second composition of one or more layers for a second frame for display at the display client;
determining a third composition of one or more layers for a third frame for display at the display client; and
determining that the first composition corresponds to multiple full-frame updates when the first composition indicates different pixel data for a pixel than pixel data indicated by the second composition and pixel data indicated by the third composition.

8. The method of claim 1, wherein determining the expected video mode bandwidth usage for outputting a next frame to the display client when operating the display client in the video mode comprises:
determining the composition corresponds to a maximum display refresh rate for the display client,
wherein the selecting the video mode or the command mode comprises selecting the video mode.

9. The method of claim 1, wherein:
determining the expected video mode bandwidth usage comprises determining the expected video mode bandwidth usage based on one or more composition characteristics for pixel data to be output for the next frame to the display client when operating the display client in the video mode, wherein the one or more composition characteristics include one or more of a source width, a source height, a format, a frame-per-second value, a destination width, a destination height, or a composition factor; and
determining the expected command mode bandwidth usage comprises determining the expected command mode bandwidth usage based on one or more composition characteristics for pixel data to be output for the next frame to the display client when operating the display client in the command mode.

10. The method of claim 1, wherein selecting the video mode or the command mode based on the comparison comprises:
selecting the video mode when the expected video mode bandwidth usage is less than the expected command mode bandwidth usage; or
selecting the command mode when the expected command mode bandwidth usage is less than the expected video mode bandwidth usage.

11. The method of claim 1, further comprising:
outputting, by the processor, one or more instructions to generate pixel data for the selected mode.

12. The method of claim 1, wherein the processor is a first processor and wherein selecting the video mode or the command mode as the selected mode comprises:
selecting, by the first processor, the video mode or the command mode as the selected mode, for operating a second processor of the computing device, based on the determined composition, wherein the second processor outputs pixel data for each frame to be displayed to the display client when operating in the video mode and wherein the second processor outputs pixel data for frames that include different pixel data for at least one pixel than a previously output frame output to the display client when operating in the command mode.

13. The method of claim 12, wherein the first processor is a central processing unit and wherein the second processor is a display processor or a graphics processing unit.

14. A device for graphics processing comprising:
a display client configured to output pixel data at a display; and
a processor configured to:
determine a composition of one or more layers for display at the display client;
select a video mode or a command mode as a selected mode, based on the determined composition, wherein pixel data for each frame to be displayed is output to the display client when operating in the video mode and wherein pixel data for frames that include different pixel data for at least one pixel than a previously output frame is output to the display client when operating in the command mode, and wherein, to select, the processor is configured to:
determine, using the composition, an expected video mode bandwidth usage for outputting a next frame to the display client when operating the display client in the video mode;
determine, using the composition, an expected command mode bandwidth usage for outputting the next frame to the display client when operating the display client in the command mode;
compare the expected video mode bandwidth usage and the expected command mode bandwidth usage; and
select the video mode or the command mode based on the comparison; and
output an instruction to operate in the selected mode.

15. The device of claim 14, wherein, to determine the expected command mode bandwidth usage for outputting the next frame to the display client when operating the display client in the command mode, the processor is configured to:
determine the composition corresponds to no changes from a previous composition of the one or more layers for display at the display client,
wherein to select the video mode or the command mode comprises selecting the command mode.

16. The device of claim 14, wherein, to determine the expected video mode bandwidth usage for outputting a next frame to the display client when operating the display client in the video mode, the processor is configured to:
determine the composition corresponds to a single layer, wherein to select the video mode or the command mode comprises selecting the video mode.

17. The device of claim 16, wherein the processor is configured to:
execute one or more of a full-screen reader, an animation, or a settings application scroll to generate one or more instructions for the single layer, wherein, to determine the composition, the processor is configured to determine that the composition corresponds to the single layer based on the execution of one or more of the full-screen reader, the animation, or the settings application scroll.

18. The device of claim 17, further comprising:
a graphics processing unit, wherein the processor is configured to:
output the one or more instructions to the graphics processing unit; and
receive the composition from the graphics processing unit.

19. The device of claim 14, wherein, to determine the expected video mode bandwidth usage for outputting a next frame to the display client when operating the display client in the video mode, the processor is configured to:
determine the composition corresponds to multiple full-frame updates,
wherein to select the video mode or the command mode comprises selecting the video mode.

20. The device of claim 19, wherein the composition is a first composition for a first frame and wherein, to determine the first composition corresponds to multiple full-frame updates, the processor is configured to:
determine a second composition of one or more layers for a second frame for display at the display client;
determine a third composition of one or more layers for a third frame for display at the display client; and
determine that the first composition corresponds to multiple full-frame updates when the first composition indicates different pixel data for a pixel than pixel data indicated by the second composition and pixel data indicated by the third composition.

21. The device of claim 14, wherein, to determine the expected video mode bandwidth usage for outputting a next frame to the display client when operating the display client in the video mode, the processor is configured to:
determine the composition corresponds to a maximum display refresh rate for the display client,
wherein to select the video mode or the command mode comprises selecting the video mode.

22. The device of claim 14, wherein, to select the video mode or the command based on the comparison, the processor is configured to:
select the video mode when the expected video mode bandwidth usage is less than the expected command mode bandwidth usage; or
select the command mode when the expected command mode bandwidth usage is less than the expected video mode bandwidth usage.

23. The device of claim 14, wherein the processor is configured to:
output one or more instructions to generate pixel data for the selected mode.

24. The device of claim 23, wherein, to output the one or more instructions to generate the pixel data for the selected mode, the processor is configured to:
in response to selecting the command mode as the selected mode, output one or more instructions to generate pixel data representative of an upcoming frame for storage at a buffer of the display client.

25. The device of claim 14, wherein the device comprises one or more of a camera, a computer, a mobile device, a broadcast receiver device, or a set-top box.

26. The device of claim 14, wherein the device comprises at least one of:
an integrated circuit;
a microprocessor; or
a wireless communication device.

27. A device for graphics processing comprising:
means for determining a composition of one or more layers for display at a display client;
means for selecting a video mode or a command mode as a selected mode, based on the determined composition, wherein pixel data for each frame to be displayed is output to a display client when operating in the video mode and wherein pixel data for frames that include different pixel data for at least one pixel than a previously output frame is output to the display client when operating in the command mode, and wherein the means for selecting comprise:
- means for determining, using the composition, an expected video mode bandwidth usage for outputting a next frame to the display client when operating the display client in the video mode;
- means for determining, using the composition, an expected command mode bandwidth usage for outputting the next frame to the display client when operating the display client in the command mode;
- means for comparing the expected video mode bandwidth usage and the expected command mode bandwidth usage; and
- means for selecting the video mode or the command mode based on the comparison; and means for outputting an instruction to operate in the selected mode.

28. A non-transitory computer-readable storage medium storing instructions that, when executed, cause a processor to:
- determine a composition of one or more layers for display at a display client;
- select a video mode or a command mode as a selected mode, based on the determined composition, wherein pixel data for each frame to be displayed is output to a display client when operating in the video mode and wherein pixel data for frames that include different pixel data for at least one pixel than a previously output frame is output to the display client when operating in the command mode, and wherein, to select, the instructions further cause the processor to:
  - determine, using the composition, an expected video mode bandwidth usage for outputting a next frame to the display client when operating the display client in the video mode;
  - determine, using the composition, an expected command mode bandwidth usage for outputting the next frame to the display client when operating the display client in the command mode;
  - compare the expected video mode bandwidth and the expected command mode bandwidth usage; and
  - select the video mode or the command mode based on the comparison; and
- output an instruction to operate in the selected mode.

* * * * *